United States Patent
Yamamoto et al.

(10) Patent No.: US 7,416,306 B2
(45) Date of Patent: Aug. 26, 2008

(54) LASER PROJECTOR

(75) Inventors: Kazuhisa Yamamoto, Takatsuki (JP); Kiminori Mizuuchi, Neyagawa (JP); Yasuo Kitaoka, Ibaraki (JP); Ken'ichi Kasazumi, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 154 days.

(21) Appl. No.: 10/559,460

(22) PCT Filed: Jun. 4, 2004

(86) PCT No.: PCT/JP2004/008158

§ 371 (c)(1),
(2), (4) Date: Dec. 5, 2005

(87) PCT Pub. No.: WO2004/109390

PCT Pub. Date: Dec. 16, 2004

(65) Prior Publication Data

US 2006/0158725 A1 Jul. 20, 2006

(30) Foreign Application Priority Data

Jun. 6, 2003 (JP) .............................. 2003-161777

(51) Int. Cl.
- G03B 21/00 (2006.01)
- G03B 21/26 (2006.01)
- G03B 21/28 (2006.01)
- G03B 21/56 (2006.01)
- G03H 1/02 (2006.01)
- G02B 5/32 (2006.01)
- G02B 27/14 (2006.01)
- G02F 1/1335 (2006.01)
- H04N 5/74 (2006.01)

(52) U.S. Cl. .............................. 353/31; 353/37; 353/84; 353/98; 359/3; 359/15; 359/27; 359/28; 359/449; 359/634; 348/750; 348/758; 349/8

(58) Field of Classification Search .................. 353/31, 353/30, 37, 84, 98, 99, 102, 122; 359/1, 359/3, 10, 12, 15, 27, 28, 30, 31, 33, 443, 359/449, 618, 629, 634; 348/739, 744, 750, 348/751, 758, 759, 761, 771, E9.026; 349/5, 349/7, 8, 22, 55

See application file for complete search history.

(56) References Cited

U.S. PATENT DOCUMENTS 6,392,766 B1    5/2002   Gnaedig et al. ................ 359/15

FOREIGN PATENT DOCUMENTS

| JP | 2000-197069 | 7/2000 |
| JP | 2001-507819 | 6/2001 |
| WO | 96/038757 | 12/1996 |

OTHER PUBLICATIONS

Translation of JP 2000-197069, Jul. 14, 2000.*

* cited by examiner

*Primary Examiner*—Rochelle Blackman
(74) *Attorney, Agent, or Firm*—Wenderoth, Lind & Ponack, L.L.P.

(57) ABSTRACT

A reflection-type laser projector (100) projects modulated laser beams outputted from a laser projection unit (40), on a screen, wherein a reflector (112) as a constituent of the screen (110) has reflection characteristics of reflecting, among the incident light, only laser beams of three colors of red, blue, and green, which are projected from the laser projection unit (40) and light in the neighboring wavelength band, and transmitting light in other wavelength bands, thereby preventing pictures on the screen (110) from becoming hard to be seen due to effects of indoor illumination or light from outdoors.

10 Claims, 10 Drawing Sheets

A: acceptable wavelength range 331  filter 332  330 ceiling 341  cover including filter 342  340

LASER PROJECTOR

TECHNICAL FIELD

The present invention relates to laser projectors and, more particularly, to laser projectors which are employed in the optical information field, utilizing coherent light.

BACKGROUND ART

In recent years, laser projectors which employ laser beams for projection lights have been developed as projector devices. A reflection-type laser projector is disclosed in WO96/038757.

Hereinafter, such a prior art laser projector will be described.

FIG. 14(a) illustrates a structure of a prior art laser projector.

A prior art laser projector 600 has a laser projection unit 40 which outputs laser beams 41, and a screen 610 onto which the laser beams 41 from the laser projection unit 40 are projected. The screen 610 comprises a reflector 611 which reflects incident light such as the laser beams 41, and a diffuser 612 which is placed at the front of the reflector 611 and diffuses light. In this case, ground glass or a group of minute planar lenses having shallow concavo-convexes are used as the diffuser 612.

The laser projection unit 40 has a red laser 1, a blue laser 2, and a green laser 3 as short-wavelength laser sources which emit laser beams of three colors of red, blue, and green. The laser projection unit 40 has corresponding mirrors 51a, 52a, and 53a which reflect the three color laser beams P1, P2, and P3 from the short-wavelength laser sources, and a light modulation unit 20 which modulates the three color laser beams P1-P3, respectively.

FIG. 14(b) is a diagram illustrating a specific structure of the light modulation unit 20.

The light modulation unit 20 has liquid crystal cells 71, 72, and 73 that modulate the lights from the corresponding lasers 1, 2, and 3 in accordance with a video signal Sv, mirrors 51b, 52b, and 53b that reflect the laser beams P1, P2, and P3 which are reflected by the mirrors 51a, 52a, and 53a, respectively, and lens systems 61a, 62a, and 63a which project the laser beams P1-P3 which are reflected by the respective mirrors 51b, 52b, and 53b onto the corresponding liquid crystal cells 71, 72, and 73. In FIG. 14(a), the liquid crystal cells 71, 72, and 73 corresponding to the laser beams P1-P3 are abbreviated as liquid crystal cell 7, respectively, and the lens systems 61a, 62a, and 63a corresponding to the laser beams P1-P3 are abbreviated as lens system 6a, respectively.

The light modulation unit 20 further includes an optical device 8 that outputs the laser beams P1-P3 which are modulated by the liquid crystal cells 71, 72, and 73 with aligning the optical axes thereof with each other, and a lens system 6b that irradiates the laser beams which are outputted from the optical device 8 onto the screen 610 with enlarging those laser beams.

In this case, the red laser 1 outputs an output light of a semiconductor laser as a red laser beam, and the blue laser 2 and the green laser 3 output a blue laser beam and a green laser beam, respectively, utilizing wavelength conversion of the semiconductor laser light. As the screen 610, a screen of gain 1 (a size of 90 inches) that is usually employed in a normal projector utilizing a mercury vapor lamp is employed.

Next, the operation will be described.

In this laser projector 600, the laser beams P1, P2, and P3 that are emitted from the respective lasers 1, 2, and 3 are projected onto the liquid crystal cell 7 through mirrors, and the laser beams that are modulated by the liquid crystal cell 7 are projected onto the screen 610.

More specifically, the red laser 1 exercises a continuous light emitting operation, and the red laser beam P1 emitted therefrom is reflected by the mirrors 51a and 51b to change the destination. Then, the red laser beam P1 reflected by the mirrors 51a and 51b is projected by the lens system 61a onto the liquid crystal cell 71 and is modulated by the liquid crystal cell 71 according to a video signal Sv. The red laser beam P1 modulated by the liquid crystal cell 71 is inputted to the optical device 8, and the red laser beam P1 that is outputted from the optical device 8 is enlarged by the lens system 6b to be projected on to the screen 610. Similarly, the blue laser beam P2 and the green laser beam P3 that are emitted from the blue laser 2 and the green laser 3, respectively, are projected onto the corresponding liquid crystal cells 72 and 73 through mirrors 52a, 53a, 52b, and 53b and lens systems 62a and 63a, and the blue laser beam P2 and the green laser beam P3 which are modulated by the corresponding liquid crystal cells are projected onto the screen 610 through the optical device 8 and the lens system 6b.

Reflectance of the conventional screen 610 onto which the laser beams are projected is kept approximately constant over a wavelength range except for a wavelength range where luminosity factor, i.e., sensitivity to light of human eyes, is significantly low (i.e., shorter than 400 nm or longer than 700 nm), as shown in FIG. 16.

With this screen 610, a person observes the light that is reflected or scattered by the screen 610 from the front face of the screen 610 (from the side of the laser projection unit). When the entire surface of the screen 610 is full white, the screen 610 has the brightness of approximately 200 lux.

However, in cases where the laser beam 41 is projected on the screen 610 and a person observes the laser beam 41 that is reflected by the screen from the front face of the screen 610, as described above, a phenomenon of "grayish-block" occurs, i.e., a phenomenon in which pictures on the screen 610, which should be originally black, are seen as whitish when for example indoor illumination 30 or outdoor light 31 is applied to the screen 610 as shown in FIG. 15. In FIG. 15, reference numeral 32 denotes a reflected illumination light, and numeral 42 denotes a reflected laser beam.

To be more specific, in a situation where the brightness on the screen 610 is 20 lux when the indoor illumination 30 is on, the contrast of pictures on the screen 610 is 1000:1 when the indoor illumination 30 is turned off, while the contrast is lowered to 10:1 by turning on the indoor illumination 30.

The present invention is made to solve the above-mentioned problem, and it has for its object to provide a laser projector that can prevent pictures on the screen from becoming hard to be seen due to effects of indoor illumination or light from the outdoors.

SUMMARY OF THE INVENTION

To solve the above-mentioned problems, according to the present invention, a laser projector which modulates laser beams, and projects the modulated laser beams is provided, and comprises: short-wavelength laser sources that emit at least laser beams of three colors of red, blue, and green; a modulation unit that modulates the laser beams from the laser sources in accordance with a picture signal; and a screen onto which the modulated laser beams are projected, in which the screen has characteristics of reflecting incident light such that reflection peaks for the incident light are located at the wavelengths of at least laser beams of three colors of red, blue, and green, which are emitted from the short-wavelength laser sources, and at the neighboring wavelengths.

Thereby, even when, in addition to laser beams in which video information is included, light other than these laser beams (for example, indoor illumination or outside light such as sunlight) is applied to the screen, it is possible to prevent the light other than the laser beams from being reflected by the screen, and consequently, prevent pictures on the screen from becoming hard to be seen because of effects of the light other than the laser beams.

Further, according to the present invention, the screen has a reflector which reflects only at least laser beams of three colors of red, blue, and green emitted from the short-wavelength laser sources and lights in neighboring wavelength bands.

Thereby, it is possible to make the screen have the reflection characteristics of reflecting only the laser lights and their neighboring wavelengths, and transmitting light of other wavelengths (for example, indoor illumination or outside light such as sunlight).

Further, according to the present invention, the widths of the neighboring wavelengths of the wavelengths of at least laser beams of three colors of red, blue, and green reflected by the reflectors, are longer than 3 nm and shorter than 10 nm, while having the wavelengths of the respective laser beams at their centers, respectively.

Thereby, it is possible to further prevent grayish-block phenomenon from occurring in pictures on the screen, thereby improving contrast of the pictures.

Further, according to the present invention, the reflector comprises a dielectric multilayer film.

Thereby, it is possible to easily realize a screen that has reflection characteristics of reflecting only wavelengths of laser beams and the neighboring wavelengths.

Further, according to the present invention, the reflector is formed using a hologram recording material.

Thereby, it is possible to realize a screen that has reflection characteristics of reflecting only wavelengths of laser beams and the neighboring wavelengths, and has high bending strength.

Further, according to the present invention, a projection room in which the screen is placed is illuminated by illumination light that has significantly low levels of wavelength components corresponding to the wavelengths of at least laser beams of three colors of red, blue, and green, which are emitted from the short-wavelength laser sources.

Thereby, it is possible to make grayish-block phenomenon hardly occur in pictures on the screen even when light other than the laser beams is applied to the screen, thereby greatly improving the contrast of the pictures on the screen.

According to the present invention, a laser projector is provided which modulates laser beams, and projects the modulated laser beams, and which comprises: short-wavelength laser sources which emit at least laser beams of three colors of red, blue, and green; a modulation unit that modulates the laser beams from the laser sources in accordance with a picture signal; a screen onto which the modulated laser beams are projected; and an observing instrument for observing pictures which are projected on the screen, in which the observing instrument is used to observe pictures which are projected on the screen through a light transmitting member whose transmission peaks for incident light are located at the wavelengths of at least laser beams of three colors of red, blue, and green, which are emitted from the short-wavelength laser sources, and at the neighboring wavelengths.

Thereby, it is possible to prevent grayish-block phenomenon from occurring in pictures on the screen when light other than the laser beams is applied to the screen, in cases where a conventional laser projector is employed.

According to the present invention, a laser projector is provided which modulates laser beams, and projects the modulated laser beams, and which comprises: short-wavelength laser sources that emits at least laser beams of three colors of red, blue, and green; a modulation unit that modulates the laser beams from the laser sources in accordance with a picture signal; and a screen onto which the modulated laser beams are projected, in which the screen has characteristics of transmitting incident light such that transmission peaks for the incident light are located at the wavelengths of at least laser beams of three colors of red, blue, and green, which are emitted from the short-wavelength laser sources, and the neighboring wavelengths.

Thereby, even when light other than laser beams (for example, indoor illumination or outside light such as sunlight) in which video information is included is applied to the screen, this light is not transmitted through the screen and only at least laser beams of three colors of red, blue, and green are transmitted, whereby it can be prevented that pictures become hard to be seen, even in a rear-type laser projector.

Further, according to the present invention, the screen has an absorber that transmits at least laser beams of three colors of red, blue, and green, which are emitted from the short-wavelength laser sources and lights in a neighboring wavelength band, and lights in a wavelength band where luminosity factor is significantly low.

Thereby, it is possible to make the screen have transmission characteristics of reflecting only laser lights and their neighboring wavelengths but absorbing lights of other wavelengths (for example, indoor illumination or outside light such as sunlight).

Further, according to the present invention, the wavelength range neighboring the wavelengths of at least laser beams of three colors of red, blue, and green, which are transmitted by the absorber, is longer than 3 nm and shorter than 10 nm, with the wavelengths of the respective laser beams being in the center.

Thereby, it is possible to further prevent grayish-block phenomenon from occurring in pictures on the screen, thereby improving the contrast of the pictures.

Further, according to the present invention, the absorber is formed by laminating plural filters each cutting only lights with predetermined wavelengths, among light incident on the absorber.

Thereby, it is possible to realize a screen that absorbs light other than lights with the wavelengths of laser beams and the neighboring wavelengths, and includes no grayish-block phenomenon in pictures on the screen.

Further, according to the present invention, the laser sources are located on the rear side of the screen, and light projected from the laser sources on the screen is observed from the front side of the screen.

Thereby, it is possible to improve the contrast of pictures on the screen even in the case of rear-projection type video projectors.

Further, according to the present invention, a projection room in which the screen is placed is illuminated by illumination light that has significantly low levels of wavelength components corresponding to the wavelengths of at least laser beams of three colors of red, blue, and green, which are emitted by the short-wavelength laser sources.

Thereby, it is possible to make grayish-block phenomenon hardly occur in pictures on the screen even when light other than the laser beams is applied on the screen, thereby greatly improving the contrast of the pictures on the screen.

BRIEF DESCRIPTION OF THE DRAWINGS

FIG. 7($b$) is a diagram showing away of producing the reflector according to the second embodiment.

FIG. 9($b$) is a diagram illustrating another example of indoor illumination according to the third embodiment.

FIG. 14($b$) is a diagram illustrating a specific structure of a light modulation unit of the prior art laser projector.

DETAILED DESCRIPTION OF PREFERRED EMBODIMENTS

Embodiment 1

Hereinafter, a first embodiment of the present invention will be described with reference to FIGS. 1 to 4.

A laser projector according to the first embodiment is a reflection-type laser projector, in which the screen has reflection characteristics of reflecting only wavelengths of laser beams which are outputted from the laser projection unit and the neighboring wavelengths, and this laser projector modulates the laser beams from the laser projection unit, and projects the modulated laser beams on the screen having such reflection characteristics.

Figure 1:
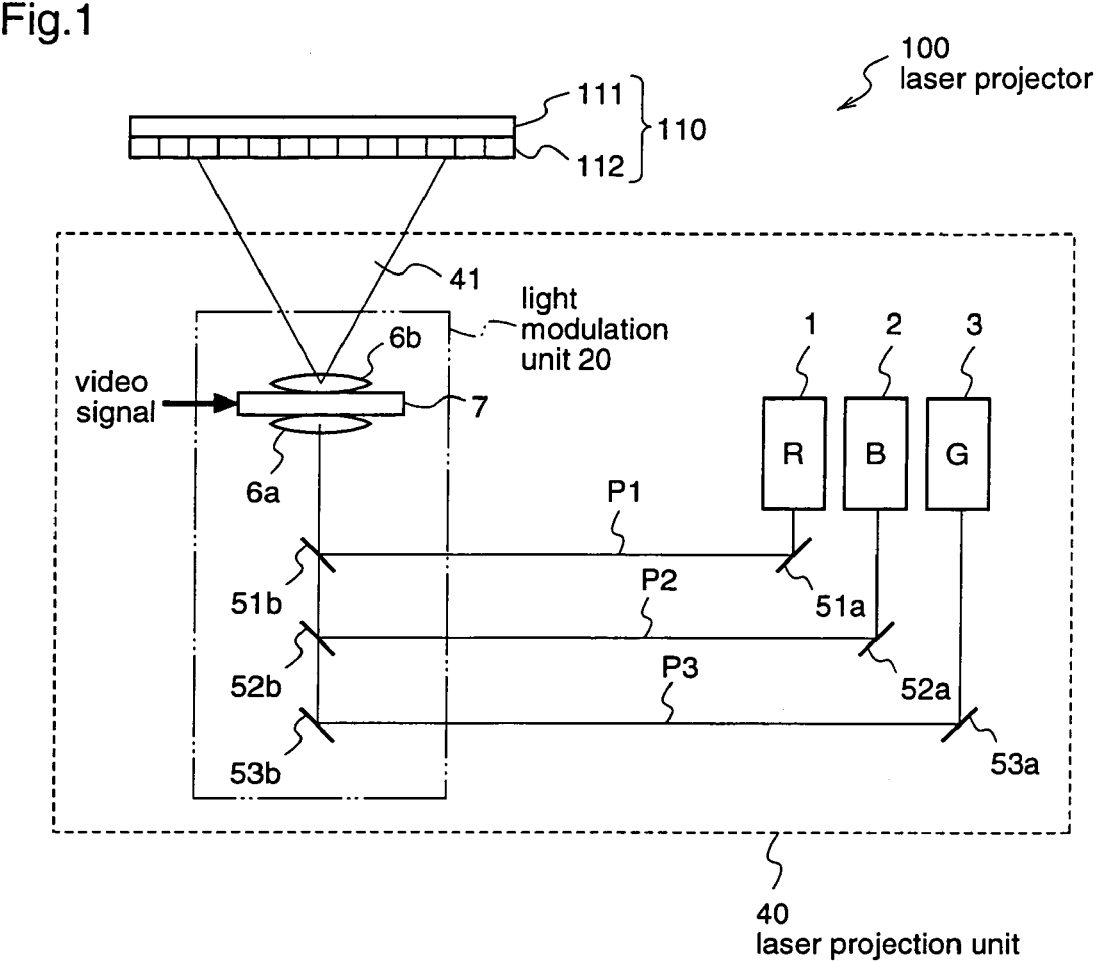
FIG. 1 is a diagram illustrating a structure of a laser projector according to a first embodiment of the present invention.

FIG. 1 is a diagram for explaining a laser projector 100 according to the first embodiment.

The laser projector 100 according to the first embodiment has a laser projection unit 40 that outputs laser beams 41, and a screen 110 onto which the laser beams 41 from the projection unit 40 are projected.

According to the first embodiment, the screen 110 comprises a reflector 111 which reflects, among lights incident on the screen 110, only lights with specific wavelengths, i.e., only the laser beams that are outputted from the laser projection unit 40 and lights in the neighboring wavelength band, and transmits lights with other wavelengths, and a diffuser 112 which is placed at the front of the reflector 111 and diffuses light. As the diffuser 112, ground glass or a group of minute planar lenses having shallow concavo-convexes, or the like are employed, as in the prior art laser projector 600.

In this first embodiment, the laser projection unit 40 has a structure substantially similar to that of the prior art laser projector 600. Hereinafter, a brief description will be initially given of a laser that is used in this first embodiment as a short-wavelength light source.

The read laser 1 emits light of a red semiconductor laser of 640 nm, as a red laser beam. The blue laser 2 and the green laser 3 perform wavelength conversion for the output light from the semiconductor laser, thereby emitting a blue laser beam and a green laser beam.

In this embodiment, a 640 nm red semiconductor laser is used as the red laser 1, and short-wavelength laser sources which subject the laser output from the semiconductor laser to light wavelength conversion are used as the blue laser 2 and the green laser 3. As a light wavelength conversion element that performs the light wavelength conversion, an MgO-doped LiNbO3 substrate is employed. Since short-wavelength laser sources employed as the blue laser 2 and the green laser 3 are of the same structure, the blue laser will be briefly described below.

The semiconductor laser used here has the wavelength of 930 nm and the output power of 600 mW. A blue light beam of 200 mW (the wavelength of 465 nm) is obtained from this 600 mW semiconductor laser. Further, 200 mW laser power output is obtained from the green laser, and 400 mW laser power output is obtained from the red semiconductor laser. The laser beams emitted from the corresponding lasers have stable lateral mode and power, and good color reproducibility, and further, provide pictures of good contrast on the screen.

Next, a description is given of screen 110 in laser projector 100 according to the first embodiment.

In this first embodiment, as the reflector 111 which is a constituent of the screen 110, a dielectric multilayer film is employed, for example.

Figure 3:
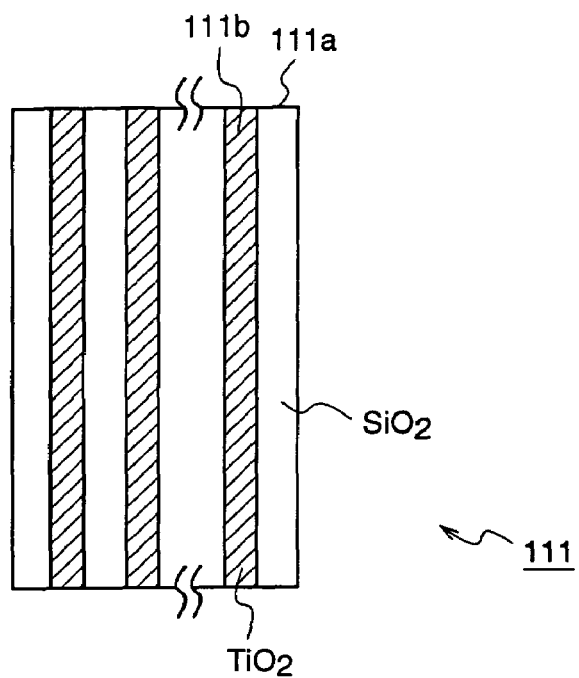
FIG. 3 is a diagram illustrating an example of a reflector according to the first embodiment.

The dielectric multilayer film is produced by alternately laminating $SiO_2$ layers 111$a$ and $TiO_2$ layers 111$b$ as shown in FIG. 3. Approximately 50 pieces of $SiO_2$ layers 111$a$ and approximately 50 pieces of the $TiO_2$ layers 111$b$ are laminated.

Figure 4:
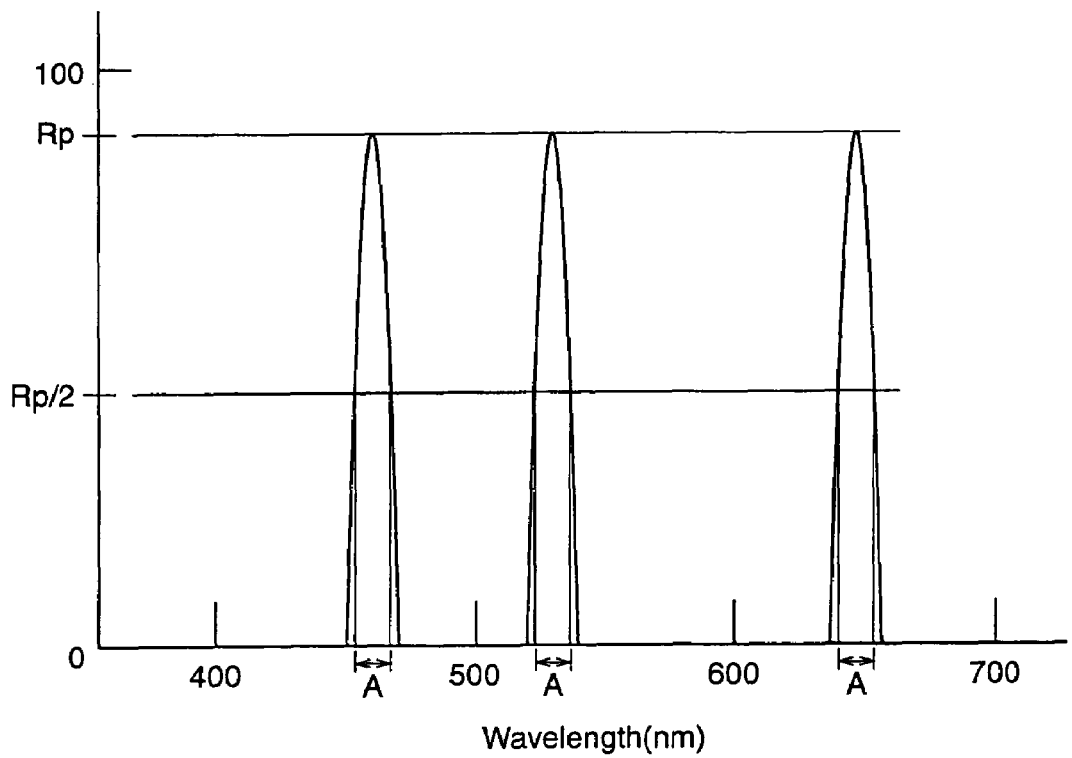
FIG. 4 is a diagram showing reflection characteristics of a screen according to the first embodiment.

FIG. 4 shows reflection characteristics of the reflector 111 comprising the dielectric multilayer film. The reflector 111 has reflection characteristics of reflecting 95% of blue light (465 nm), green light (532 nm), and red light (635 nm) which are incident thereto, as shown in FIG. 4.

In the screen 110 which is produced by placing the diffuser 112 at the front of the reflector 111 having the above-mentioned reflection characteristics, acceptable wavelength ranges A for the respective reflected lights in response to the incident lights that have the wavelengths of the respective laser outputs as their center wavelengths, have values within a predetermined range. Here, the acceptable wavelength ranges A are wavelength ranges which cover wavelengths at which the reflectance is higher than one-half of the reflectance (Rp) at the center wavelength.

Preferably, this acceptable wavelength range A is longer than 3 nm and shorter than 10 nm. Hereinafter, grounds for the lower limit and upper limit of the acceptable wavelength range will be briefly described.

Figure 2:
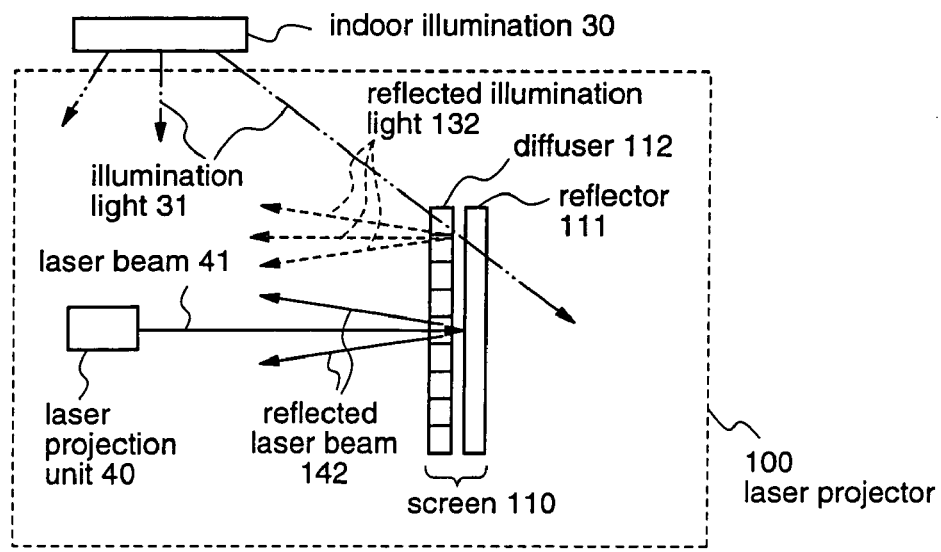
FIG. 2 is a diagram specifically illustrating a laser projection unit of the laser projector according to the first embodiment.

When, for example, a projection is performed under the indoor illumination 30 as shown in FIG. 2 by the laser projector 100 according to the first embodiment, a laser beam 41 is projected onto the screen 110 from the laser irradiation unit 40, and the laser beam 41 is reflected by the screen 110, while the irradiation light 31 from the indoor illumination 30 is hardly reflected by the screen 110 and only the wavelength component that is equivalent to a part of the laser light is reflected by the screen. Consequently, it is possible to prevent that pictures on the screen 110 become hard to be seen influenced by the illumination light 30 from the indoor illumination 30.

The reason why display of good contrast with less grayish-block phenomenon in the pictures on screen can be thus obtained even in a room having the irradiation light 31 is because the wavelength range of the laser light emitted from the laser projection unit 40 is quite narrow.

For example, when the acceptable wavelength range A exceeds 10 nm, light of indoor illumination or the like having components other than the wavelength components of the laser beams 41 emitted from the laser projection unit 40 is reflected by the screen, and thereby pictures on the screen 110 cause grayish-block phenomenon. Therefore, it is desirable that the reflection wavelength range A should not exceed 10 nm.

Besides, variations or changes in the lasing wavelength of the lasers are shorter than 2 nm even when variations in the environmental temperatures are considered. For example, when the red laser 1 has an individual variation of 1 nm in the lasing wavelength and has a wavelength change of 0.06 nm/° C. for temperature change, the variation width of the lasing wavelength becomes about 2 nm for the temperature range of 30° C. When the individual variation range (1 nm) in the lasing wavelength of the red laser 1 is added thereto, the wavelength variation range of 3 nm is obtained for this red laser 1.

From the foregoing, it is desirable that the acceptable wavelength range A for the laser beam 41 that is reflected by the screen 110 in this first embodiment should be a range that is longer than 3 nm and shorter than 10 nm with the wavelength of the laser beam 41 at its center.

In this case, a result that the contrast of pictures on the screen is improved about 10 times relative to the case of using the conventional screen is obtained.

Next, the function and effect will be described.

In the laser projector 100 according to the first embodiment, as in the prior art laser projector 600, laser beams P1, P2, and P3 that are emitted from the respective lasers 1, 2, and 3 are projected onto the liquid crystal cell 7 through mirrors, and the laser beams P1, P2, and P3 that have been modulated by the liquid crystal cell are projected onto the screen 110.

In this first embodiment, only lights having the same wavelength components as those in the projected laser beams 41 which are emitted from the respective lasers, i.e., only blue light beam (465 nm), green light beam (532 nm), and red light beam (635 nm), and lights of their neighboring wavelengths are reflected by the screen 110.

Therefore, even when the illumination light 31 of the indoor illumination 30 is incident on the screen 110 as shown in FIG. 2, lights of almost all the wavelength components thereof pass through the screen, and the illumination light 132 that was reflected by the screen 110 comprises only the same wavelength components as those in the laser beams 41 emitted from the respective lasers among the wavelength components included in the illumination light 31.

According to the first embodiment described above, in the reflection-type laser projector 100 that projects modulated laser beams outputted from the laser projection unit 40 onto a screen, the reflector 112 which is an element constituting the screen 110 is made to have reflection characteristics that reflect only laser beams of three colors (red, blue, and green) which are projected by the laser projection unit 40 as well as lights in their neighboring wavelength band among the incident lights, and transmit lights in the other wavelength bands. Therefore, the ratio of light intensity of the projected laser light 142 that has been modulated by the video signal, relative to the light intensity of the light that is not modulated by the video signal such as the illumination light 132 can be held at a large value, and thereby pictures on the screen 110 can be prevented from becoming hard to be seen affected by the indoor illumination or lights from outdoors.

Further, in this first embodiment, the wavelength range of the lights which are reflected by the reflector 111 of the screen 110 is set to be longer than 3 nm and shorter than 10 nm, with the wavelengths of the respective laser beams which are outputted from the laser projection unit 40 as their centers. Therefore, in consideration of actual wavelength variations in the lights emitted from the lasers, only the lights of projected laser outputs can be efficiently reflected on the screen 110, and there by the contrast of the pictures on the screen is greatly improved.

Embodiment 2

Hereinafter, a second embodiment of the present invention will be described with reference to FIGS. 5 to 7.

A laser projector according to the second embodiment is provided with a screen having a reflector constituted by a hologram recording material, in place of a screen having a reflector constituted by a dielectric multi-layer film according to the first embodiment, and this laser will be described in detail.

Figure 5:
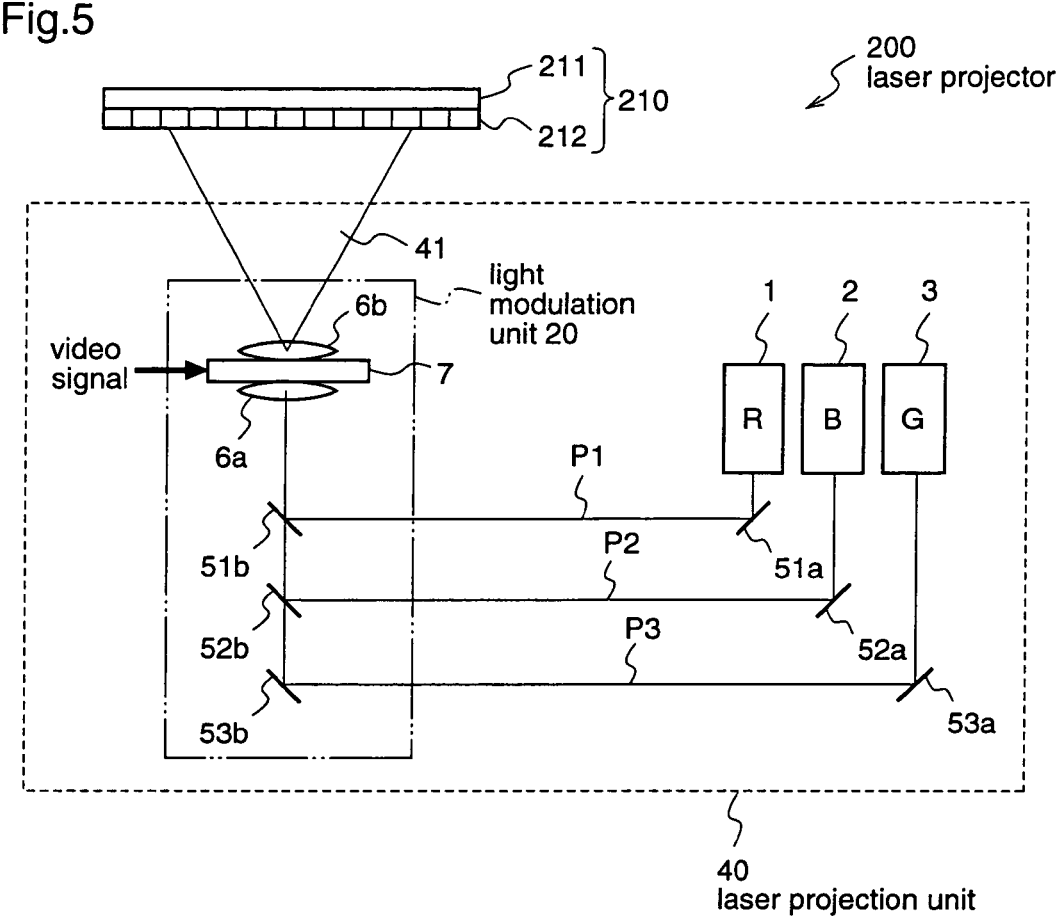
FIG. 5 is a diagram illustrating a structure of a laser projector according to a second embodiment of the present invention.

FIG. 5 is a diagram for explaining a laser projector 200 according to the second embodiment.

A laser projector 200 according to the second embodiment has a laser projection unit 40 which outputs laser beams 41, and a screen 210 onto which the laser beams 41 from the laser projection unit 41 are projected, similarly as the laser projector 100 according to the first embodiment.

According to the second embodiment, the screen 210 has a reflector 211 which reflects lights with specific wavelengths, i.e., only the wavelengths of the laser beams that are outputted from the laser projection unit 40 and their neighboring wavelengths among lights incident on the screen 210, and transmits lights with other wavelengths, and a diffuser 212 which diffuses light, disposed at the front of the reflector 211. As the diffuser 212, ground glass or a group of planar lenses having shallow concavo-convexes are employed as in the prior art laser projector 600.

In addition, according to the second embodiment, as a short-wavelength laser source of the laser projection unit 40, one which subjects laser outputs from three kinds of solid lasers that emit lights of primary colors to wavelength conversion is employed. This short-wavelength laser source according to the second embodiment will be specifically described hereinafter.

In this case, a solid laser using a Nd:YAG crystal is employed as each of the solid lasers which emit laser beams with the wavelengths of 1320 nm and 1064 nm, respectively, and a solid laser using a Nd:YVO4 crystal is employed as a solid laser which emits laser beam with the wavelength of 914 nm. Further, in this second embodiment, as the short-wavelength laser source in the laser projection unit 40, one which converts the outputs from these solid lasers into laser beams having their half wavelength by means of a second harmonic generation circuit (not shown) which performs light wavelength conversion and outputs a red laser P1 of 4 W (wavelength of 660 nm), a green laser P3 of 1 W (wavelength of 532 nm), and a blue laser P2 of 1 W (wavelength of 457 nm) is employed. Here, since the wavelengths of laser outputs from the solid lasers hardly change due to temperature changes, the utilization of solid lasers makes it possible to employ a reflector using a reflection film of a narrow wavelength band having a narrow reflecting wavelength band.

Next, the screen 210 of the laser projector 200 according to the second embodiment will be described in more detail.

In this second embodiment, the reflector 211 as the constituent of the screen 210 is formed by using a hologram recording material. The short-wavelength laser source emits the red laser beam (the wavelength of 660 nm), the green laser beam (the wavelength of 532 nm), and the blue laser beam (the wavelength of 457 nm). Thus, the reflector 211 has reflection characteristics of selectively reflecting the incident blue light (457 nm), green light (532 nm), and red light (660 nm).

Since the wavelengths to be reflected by the reflector 211 are three, i.e., 457 nm of blue, 532 nm of green, and 660 nm of red, three gratings of different periods are formed one upon another in the hologram recording material.

Figure 7A:
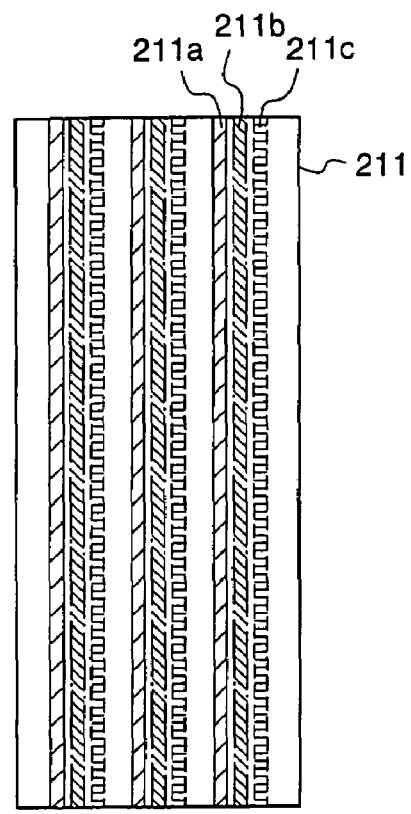
FIG. 7($a$) is a diagram illustrating an example of a reflector according to the second embodiment.
Figure 7B:
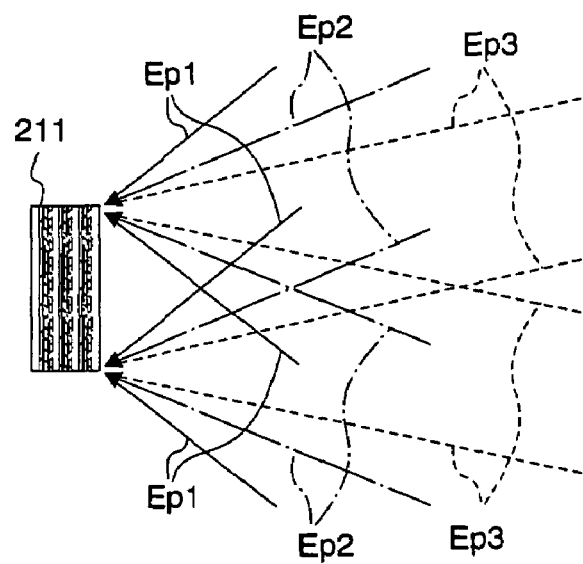

FIG. 7(*a*) shows the three gratings of different periods which are formed in the hologram recording material. Reference numeral 211*a* denotes a first exposure layer which forms a grating with a first period, numeral 211*b* denotes a second exposure layer which forms a grating with a second period, and numeral 211*c* denotes a third exposure layer which forms a grating with a third period.

The three gratings with different periods are formed by performing three times of interference exposures to the hologram recording material, for example, as shown in FIG. 7(*b*). In FIG. 7(*b*), reference characters Ep1~Ep3 denote a pair of lights having the same phase, respectively, which are employed at the first to third interference exposures. These lights Ep1~Ep3 have different incident angles to the hologram recording material.

In addition, the diffuser 212 is placed at the front of the reflector 211 as in the prior art, and diffuses lights outputted from the reflector 211. In this case, a group of minute planar lenses is employed. By arranging the minute planar lenses each having the numerical aperture of 0.1 and the diameter of 0.5 mm in one plane, an effectively-operating diffuser with little loss can be obtained.

Further, the diffuser 212 can be formed not by arranging the above-mentioned group of minute planar lenses on one side of the hologram recording material in which plural gratings are multiplexed, but by such as embossing the surface of the hologram recording material in such a form that a group of minute planar lenses is arranged. Thus, it becomes possible to integrally form the reflector 211 and the diffuser 212, and consequently, it becomes possible to provide the screen 210 having the above-mentioned reflection characteristics at a lower cost.

Next, the function and effect will be described.

With the laser projector 200 according to the second embodiment, like the laser projector 100 according to the first embodiment, the laser beams P1, P2, and P3 which have been emitted from the corresponding lasers 1, 2, and 3 are projected on the liquid crystal cell 7 through a mirror, and the laser beams P1, P2, and P3 which have been modulated by the liquid crystal cell are projected on the screen 210.

Figure 6:
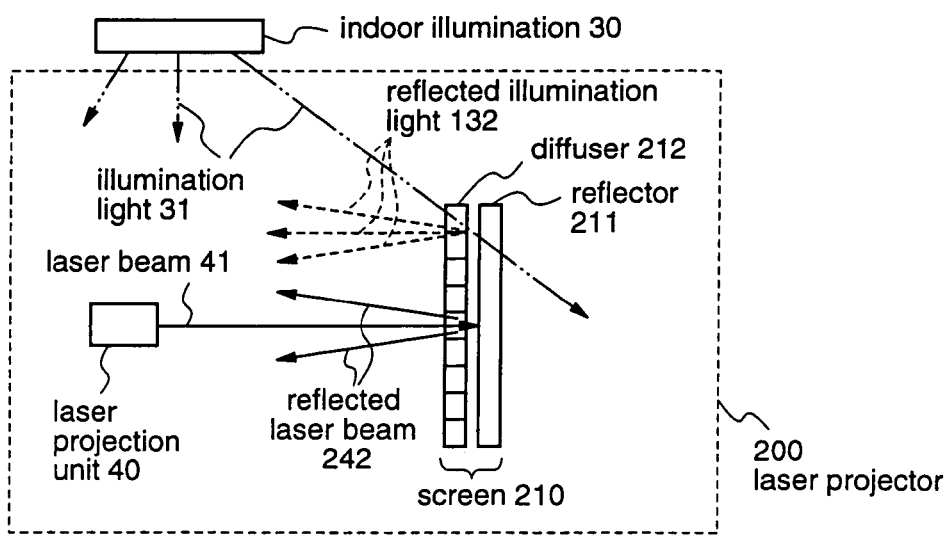
FIG. 6 is a diagram specifically illustrating a laser projection unit of the laser projector according to the second embodiment.

According to the second embodiment, the screen 210 reflects only lights of the same wavelength components as those of the projected laser beams 41 which are emitted from the respective lasers, i.e., the blue light (457 nm), the green light (532 nm), and the red light (660 nm), and lights with the neighboring wavelengths, as shown in FIG. 6.

Therefore, as shown in FIG. 6, even when the illumination light 31 of the indoor illumination 30 is incident on the screen 210, lights of most of its wavelength components pass through the screen, and reflected illumination light 132 that has been reflected by the screen 210 comprises only light of the same wavelength components as those of the laser beams 41 emitted from the respective lasers, among the wavelength components included in the illumination light 31.

Consequently, it is possible to prevent pictures on the screen 210 from becoming hard to be seen due to the effect of the illumination light 31 of the indoor light 30.

According to the second embodiment, by using the solid laser as the short-wavelength laser source of the laser projection unit 40, it is possible to narrow the reflector acceptable wavelength range A of the screen more than in the first embodiment. More specifically, since the acceptable wavelength range A can be set at 5 nm in this case, the contrast of the pictures on the screen 210 is improved up to 20, as compared to the case of utilizing the conventional screen.

As described above, the reflector 211 of the screen 210 according to the second embodiment is constructed so as to reflect, among the incident light, only lights with the wavelengths of the three color laser beams 41 which are projected by the laser projection unit 40, and the neighboring wavelengths, while transmitting other wavelengths. Therefore, it is possible to prevent grayish-block phenomenon from occurring in the pictures on the screen 210 even when the indoor illumination is turned on.

Further, as the hologram recording material is used as the reflector 211 of the screen 210 in the second embodiment, higher bending strength is obtained, and further, it is possible to integrally form the diffuser 212 and the reflector 211, thereby providing the screen having the above-mentioned reflection characteristics at a lower cost.

Embodiment 3

Hereinafter, a third embodiment of the present invention will be described with reference to FIGS. 8 and 9.

A laser projector according to the third embodiment is identical to the laser projector according to the first embodiment. In this third embodiment, there is employed, as an indoor illumination, one which uses a filter to interrupt lights of wavelengths corresponding to the respective laser outputs according to the first embodiment.

Figure 8:
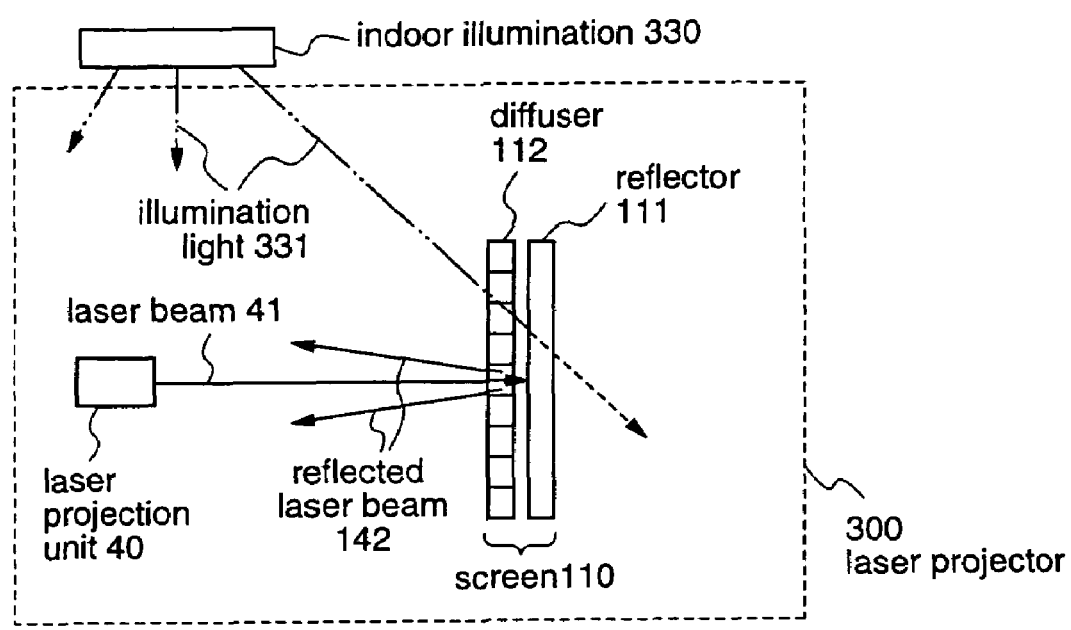
FIG. 8 is a diagram illustrating a structure of a laser projector according to a third embodiment of the present invention.

FIG. 8 is a diagram for explaining a laser projector 300 according to the third embodiment.

The laser projector 300 according to the third embodiment has a laser projection unit 40 which outputs laser beams 41, and a screen 110 onto which the laser beams 41 from the laser projection unit 40 are projected, similarly as the laser projector 100 according to the first embodiment.

Indoor illumination 330 according to the third embodiment emits illumination light 331 from which the wavelengths corresponding to the laser beams outputted from the laser projection unit 40, i.e., the wavelengths near 635 nm of the red laser beam, the wavelengths near 465 nm of the blue laser beam, and the wavelengths near 532 nm of the green laser beam, are cut out.

Figure 9A:
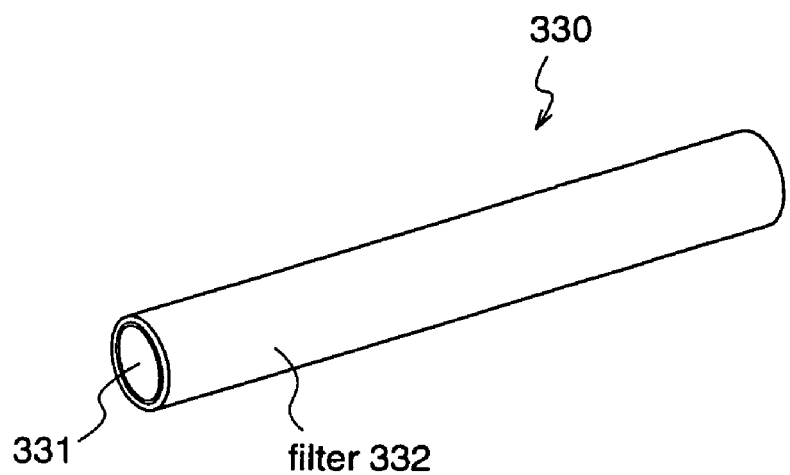
FIG. 9($a$) is a diagram illustrating an example of indoor illumination according to the third embodiment.

Here, the indoor illumination 330 is obtained by affixing a filter 332 that cuts out wavelength components corresponding to the laser beams outputted from the laser projection unit 40, surrounding a commercially available fluorescent lamp 331, for example as shown in FIG. 9(a).

Figure 9B:
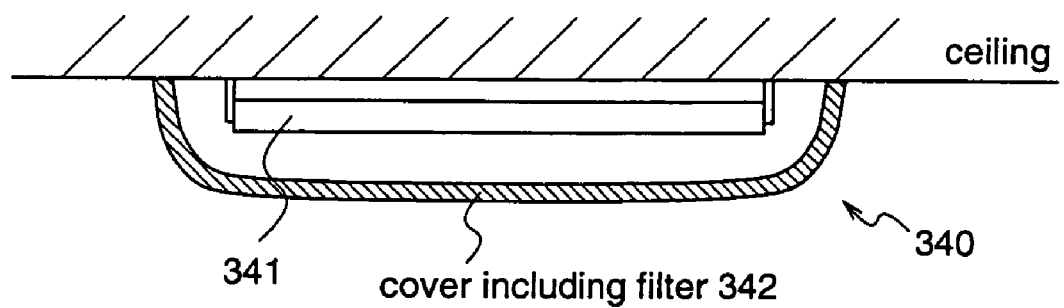

The indoor illumination used in this third embodiment is not limited to that shown in FIG. 9(a), but a cover for covering an illuminating lamp such as a fluorescent lamp 341 may be provided with a filter for cutting out wavelength components corresponding to the laser beams outputted from the laser projection unit 40, for example as shown in FIG. 9(b).

When this indoor illumination 330 is placed in a projection room, the illumination light 331 is not reflected by the screen 110 but all the lights are transmitted through the screen 110 as shown in FIG. 8 because the wavelengths of the illumination light 331 from the indoor illumination 330, which are to be reflected by the screen 110, have previously been cut out. Accordingly, only the laser beams 41 which are projected from the laser projection unit 40 are reflected by the screen 110. Consequently, it is possible to more efficiently prevent grayish-block phenomenon from occurring in pictures on the screen 110.

More specifically, the contrast of the pictures on the screen is improved up to 300 in a state where the illumination is turned on, as compared to the case of using the conventional screen.

As described above, according to the third embodiment, the reflector 111 of the screen 110 has a construction that reflects, among the incident lights, only the three color laser beams 41 which are projected from the laser projection unit 40 and lights with the neighboring wavelengths, and transmits the other wavelengths, and further, the indoor illumination 330 of the projection room in which the laser projector 40 is placed outputs the illumination light 331 from which the wavelength components corresponding to the laser beams outputted from the laser projection unit 40 have been cut out. Therefore, it is possible to completely prevent grayish-block phenomenon from occurring in the pictures on the screen 110 even when the indoor illumination 330 is turned on.

In this third embodiment the indoor illumination placed in the projection room is one which uses a filter to cut out the specific wavelength components from the light of the fluorescent lamp. For example a laser may be used as the indoor illumination.

For example, by using lasers which emit laser beams with wavelengths of 470 nm, 550 nm, and 620 nm as the indoor illumination, the selectivity of wavelengths of the light reflected by the screen is increased more, whereby the contrast of the pictures on the screen 110 is improved, and also it is possible to completely prevent grayish-block phenomenon from occurring in the pictures on the screen 110.

It is also possible to employ, as the indoor illumination 330 placed in the projection room, an LED with a different emission wavelength from the wavelengths of the laser beams 41 outputted from the laser projection unit 40. Thereby, the indoor illumination 330 to be placed in the projection room can be provided at a lower cost because the LED illumination is less expensive.

Further, while in this third embodiment the laser projector has the same structure as that of the laser projector according to the first embodiment, the laser projector according to the third embodiment may have the same structure as that of the laser projector according to the second embodiment. Also in this case, the same effect can be obtained.

Embodiment 4

Hereinafter, a fourth embodiment of the present invention will be described with reference to FIGS. 10 to 12.

A laser projector according to the fourth embodiment is a rear-projection type laser projector which projects laser beams from the rear surface of the screen, and the screen has light transmission characteristics of transmitting lights with wavelengths of the laser beams that are outputted from the laser projection unit and the neighboring wavelengths, and lights in a wavelength band where the luminosity factor is significantly low.

Figure 10:
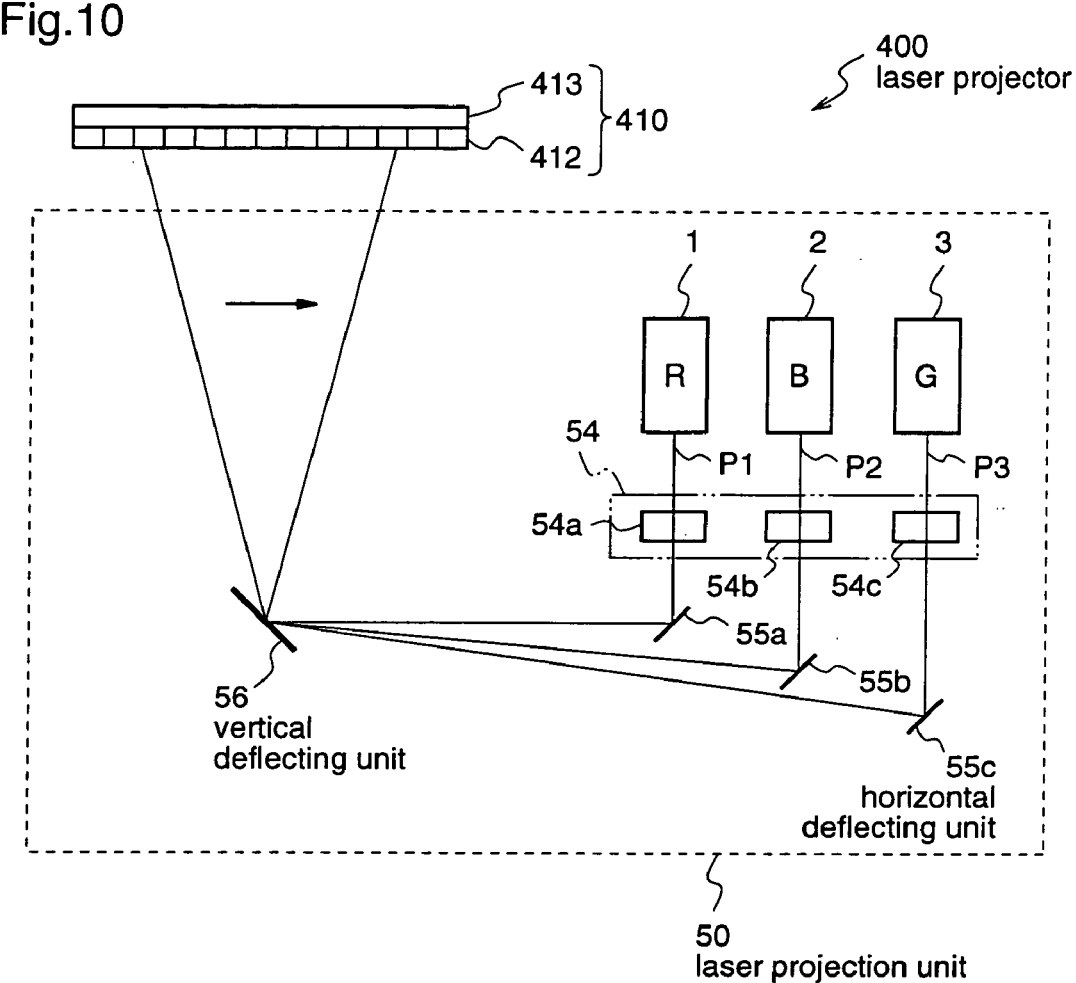
FIG. 10 is a diagram illustrating a structure of a laser projector according to a fourth embodiment of the present invention.

FIG. 10 is a diagram for explaining a laser projector 400 according to the fourth embodiment.

The laser projector 400 according to the fourth embodiment has a laser projection unit 50 which outputs laser beams 51, and a screen 410 onto which the laser beams 51 from the laser projection unit 50 are projected.

In this fourth embodiment, the screen 410 comprises an absorber 413 which transmits, among light incident on the screen 410, lights with specific wavelengths i.e., lights with the wavelengths corresponding to laser beams that are outputted from the laser projection unit 50 and the neighboring wavelengths, and lights in a wavelength band where the luminosity factor is significantly low, and absorbs lights with other wavelengths, and a diffuser 412 which is placed at the front of the absorber 413 and diffuses lights. The diffuser 412 may comprise ground glass or a group of minute planar lenses having shallow concavo-convexes, or the like.

The laser projection unit 50 modulates the respective laser beams of three colors, which are emitted from the short-wavelength laser sources, and projects the modulated laser beams on the screen 410 while performing horizontal and vertical scanning. That is, the laser projection unit 50 has red, blue, and green lasers 1, 2, and 3 which are short-wavelength laser sources that emit three colors (red, blue, and green) of laser beams, and a modulation unit 54 which comprises modulation circuits 54a~54c corresponding to the laser beams P1~P3, which modulate the three colors of laser beams P1~P3 outputted from the short-wavelength laser sources, respectively. The laser projection unit 50 has horizontal deflection units 55a, 55b, and 55c using polygon mirrors, which deflect the corresponding modulated laser beams so as to be subjected to horizontal scanning on the screen, and vertical deflection units 56a, 56b, and 56c using galvanic mirrors, which deflect the corresponding modulated laser beams to be subjected to vertical scanning on the screen. In this fourth embodiment, the red laser 1 emits, as a read laser beam, output light from a 640 nm red semiconductor laser, and the blue laser 2 and the green laser 3 emit a blue laser beam and a green laser beam by performing wavelength conversion to the light emitted from the semiconductor laser.

In this fourth embodiment, as in the first embodiment, the 640 nm red semiconductor laser is employed as the red laser 1, and short-wavelength laser sources which perform light wavelength conversion to the laser output from the semiconductor laser are employed as the blue laser 2 and the green laser 3. In addition, as a light wavelength conversion element that performs the light wavelength conversion, an MgO-doped $LiNbO_3$ substrate is employed. Because the short-wavelength laser sources which are used as the blue laser 2 and the green laser 3 have the same structure, one used as the blue laser will be briefly described.

The semiconductor laser used herein is one having the wavelength of 930 nm and the power of 600 mW. The blue light of 200 mW (the wavelength is 465 nm) is obtained by this 600 mW semiconductor laser. Further, the green laser provides a laser output of 200 mW, and the red semiconductor laser provides a laser output of 400 mW. The laser beams emitted from the respective lasers have stable lateral mode and power, and good color reproducibility, as well as realize good contrast of pictures on the screen.

Next, the screen 410 of the laser projector 400 according to the fourth embodiment will be described.

Figure 12:
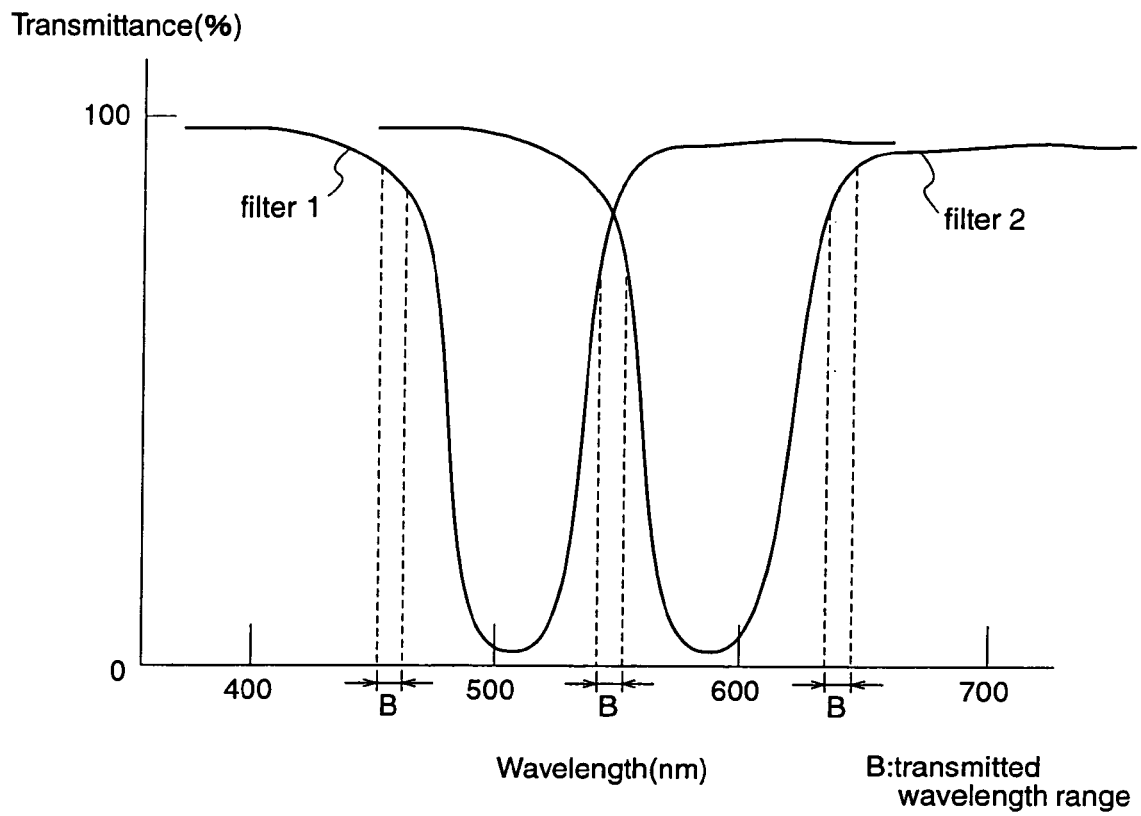
FIG. 12 is a diagram showing transmission characteristics of a screen according to the fourth embodiment.

FIG. 12 is a diagram showing transmission characteristics of the screen 410.

As described above, the screen 410 according to the fourth embodiment comprises the absorber 413 and the diffuser 412. The absorber 413 has two color filters which are placed one upon another so as to have 90% of light transmittance for the respective wavelengths of the three color laser beams which are outputted by the laser projection unit 50, i.e., 457 nm of blue, 532 nm of green, and 650 nm of red, as shown in FIG. 12. In FIG. 12, as the two filters, a filter having the absorption peak at 505 nm and a filter having the absorption peak at 590 nm are shown as an example. Although this absorber 413 also transmits the wavelengths shorter than 400 nm and the wavelengths longer than 700 nm, lights in these wavelength bands can be visually neglected even when they are transmitted through the absorber 413 because the luminosity factor is significantly low in these wavelengths.

On the other hand, the diffuser 412 of the screen 110 diffuses the lights that are transmitted by the absorber 413 to some extent. In this case, ground glass having shallow concavities and convexities is employed.

Figure 11:
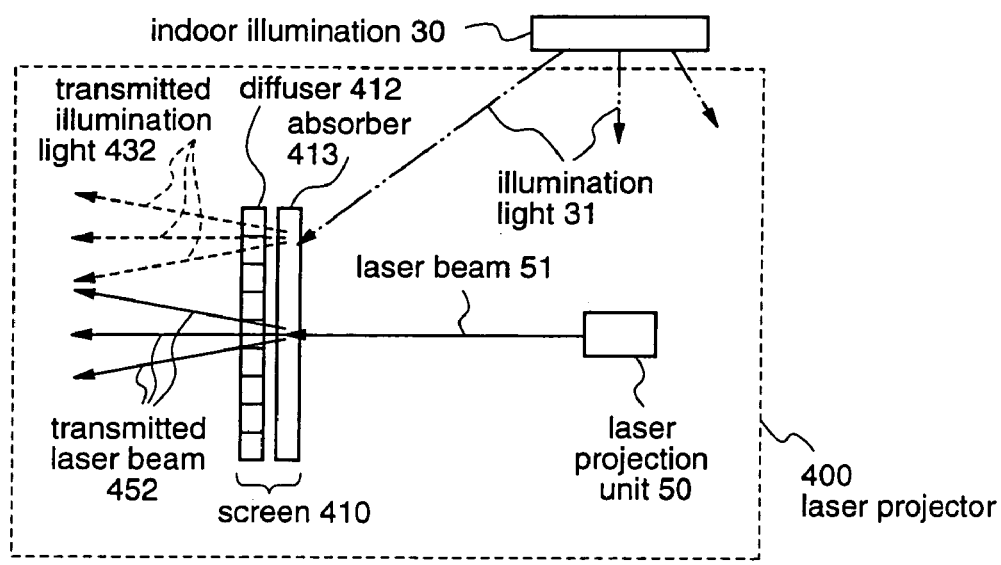
FIG. 11 is a diagram specifically illustrating a laser projection unit of the laser projector according to the fourth embodiment.

When the screen 410 having such transmission characteristics is used, only the laser beams 51 which are projected by the laser projection unit 50 and lights in the neighboring wavelength band, and lights in a wavelength band where the luminosity factor is significantly low are transmitted through the absorber 413, and lights in other wavelength bands are absorbed by the absorber 413, as shown in FIG. 11. Consequently, it is possible to considerably prevent grayish-block phenomenon from occurring in pictures on the screen 410.

As described above, less grayish-block phenomenon appears in pictures on the screen and good contrast display can be obtained even in a room where the illumination light 31 is present as described above. This is because the lasing wavelength range of the laser beams which are outputted from the laser projection unit 50 is extremely narrow.

For example, when the acceptable wavelength range B of wavelengths that are transmitted through the absorber 413, with the wavelength of the output beam from each laser being a center wavelength, exceeds 10 nm, lights of wavelength components which can be sensed by human eyes other than the wavelength components of the laser beams 51 outputted by the laser projection unit 50 pass through the absorber 413, and thereby grayish-block phenomenon would appear in pictures on the screen 410. Therefore, it is preferable that the acceptable wavelength range B of lights which pass through the absorber 413 should be shorter than 10 nm.

In addition, variations or changes in the lasing wavelength of the laser are smaller than 2 nm even when variations in environmental temperature are considered. For example, when the red laser 1 has individual variations of 1 nm with regard to the lasing wavelength and a wavelength change of 0.06 nm/° C. occurs due to temperature change, the range of variations in the lasing wavelength within, for example, a temperature range of 30° C. is approximately 2 nm, and when the individual variation range of 1 nm for the lasing wavelength of the red laser 1 is added thereto, the wavelength variation range of this laser becomes 3 nm.

From the foregoing, it is desirable that the acceptable wavelength range B of the laser beam 51 which is transmitted through the screen 410 according to the fourth embodiment should be longer than 3 nm and shorter than 10 nm, with the wavelength of the laser beam 51 being in the center.

In this case, more specifically, the contrast of the pictures on the screen is improved about 10 times as compared to the case of utilizing the conventional screen.

Next, the function and effect will be described.

In the laser projector 400 according to the fourth embodiment, the laser beams P1, P2, and P3 which are emitted from the corresponding lasers 1, 2, and 3 are modulated by the corresponding modulation circuits 54a~54c, respectively, in accordance with a video signal (not shown), and the modulated laser beams are projected on the rear surface of the screen 410 via the horizontal deflection units 55a~55c and the vertical deflection unit 56.

More specifically, the red laser 1 performs a continuous light-emitting operation, and a video signal is superimposed on the laser beam P1 emitted from the red laser 1 by the modulation circuit 54a, to scan the screen 410 with the horizontal deflection unit 55a using a polygon mirror and the vertical deflection unit 56 using a galvanic mirror. Similarly, the blue laser beam P2 and the green laser beam P3 which are emitted from the blue laser 2 and the green laser 3, respectively, are also subjected to modulation to superimpose the video signal thereon by the modulation circuits 54b and 54c, and then projected on the screen 410.

Then, among the laser beams 51 and the illumination light 31 from the indoor illumination 30, lights with wavelengths near 465 nm of the blue laser beam, 532 nm of the green laser beam, and 635 nm of the red laser beam, and lights with wavelengths which are shorter than 400 nm and longer than 700 nm in which the luminosity factor is significantly low, are transmitted through the absorber 413 of the screen 410, and the transmitted laser beams 452 and the transmitted illumination light 432 are diffused by the diffuser 412 in all directions to some extent, to be diverged from the screen 410. With the rear-transmission type laser projector 400, a person views pictures on the screen 410 from the front of the screen 410 (on the side opposite to the laser projection unit).

As described above, according to the fourth embodiment, in the rear-transmission type laser projector 400 which projects modulated laser beams that are outputted from the laser projection unit 50 on the rear surface of the screen, the absorber 413 as the constituent of the screen 410 has the transmission characteristics of transmitting, among the incident light, only three color (red, blue, and green) laser beams which are projected by the laser projection unit 50 and lights in the neighboring wavelength band, and lights in a wavelength band where the luminosity factor is significantly low. Therefore, it is possible to prevent pictures on the screen 410 from becoming hard to be seen due to the indoor illumination or lights from outdoors.

Further, according to the fourth embodiment, the range of wavelengths which are transmitted through the absorber 413 of the screen 410 is longer than 3 nm and shorter than 10 nm with the respective wavelengths of the laser beams outputted by the laser projection unit 50 being in the center. Therefore, it is possible to efficiently transmit the projected laser light beams through the screen 410 in consideration of variations in the wavelengths of the actual laser output lights, thereby greatly improving the contrast of pictures on the screen.

The rear projection type laser projector 400 also can utilize the illumination as described in the third embodiment. Accordingly, the contrast of the pictures on the screen 410 can be further increased.

Embodiment 5

Hereinafter, a fifth embodiment of the present invention will be described in FIG. 13.

In a laser projector 500 according to the fifth embodiment, pictures projected on a screen are viewed by using a light transmitting member, such as glasses having specific light transmission characteristics.

Figure 13:
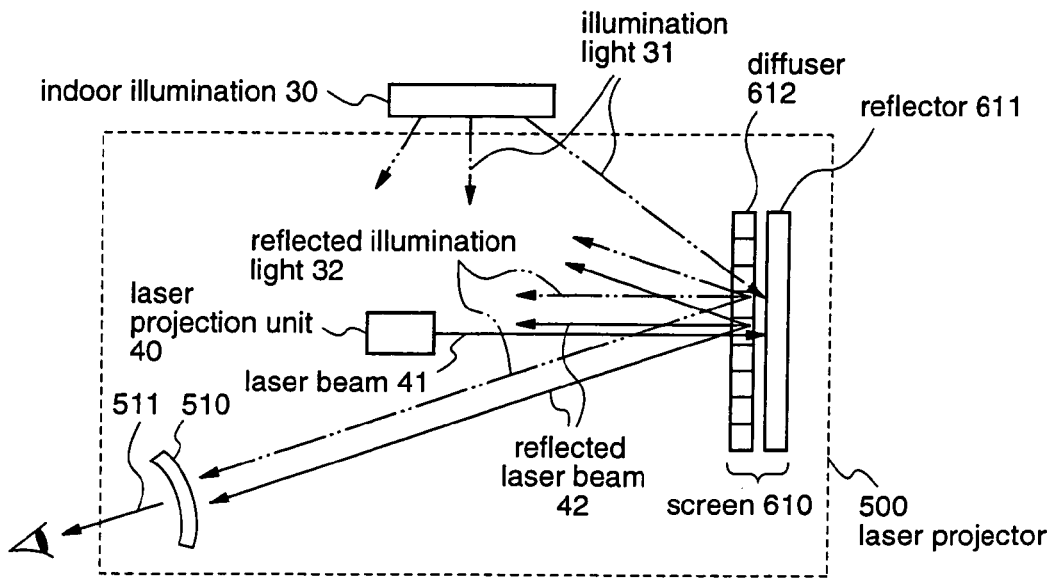
FIG. 13 is a diagram illustrating a structure of a laser projector according to a fifth embodiment of the present invention.
Figure 14A:
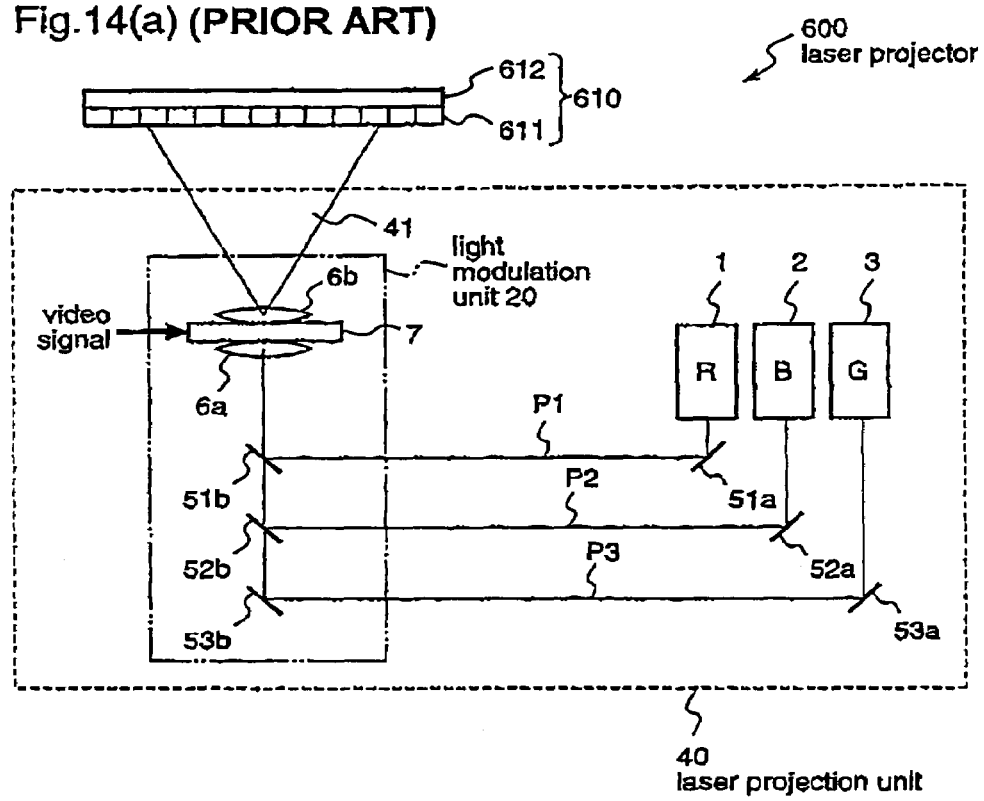
FIG. 14($a$) is a general view explaining a prior art laser projector.
Figure 14B:
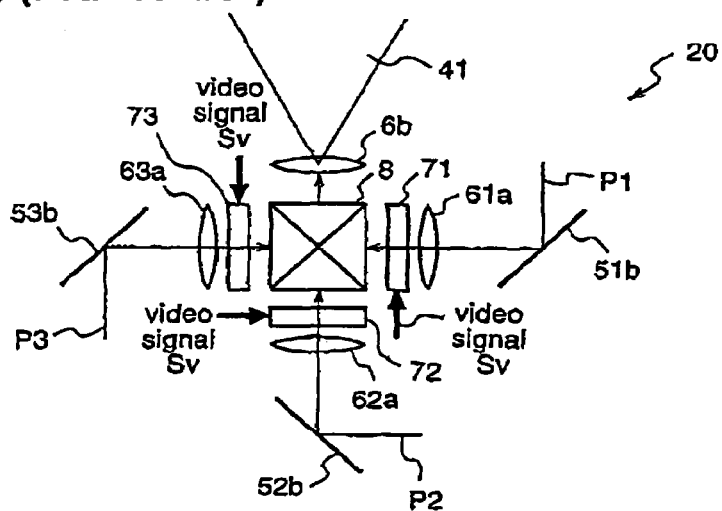
Figure 15:
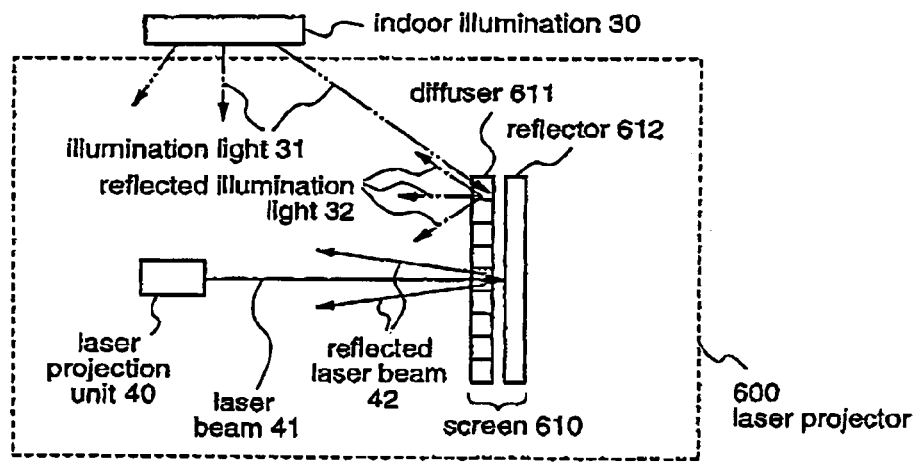
FIG. 15 is a diagram for explaining a problem of the prior art laser projector.
Figure 16:
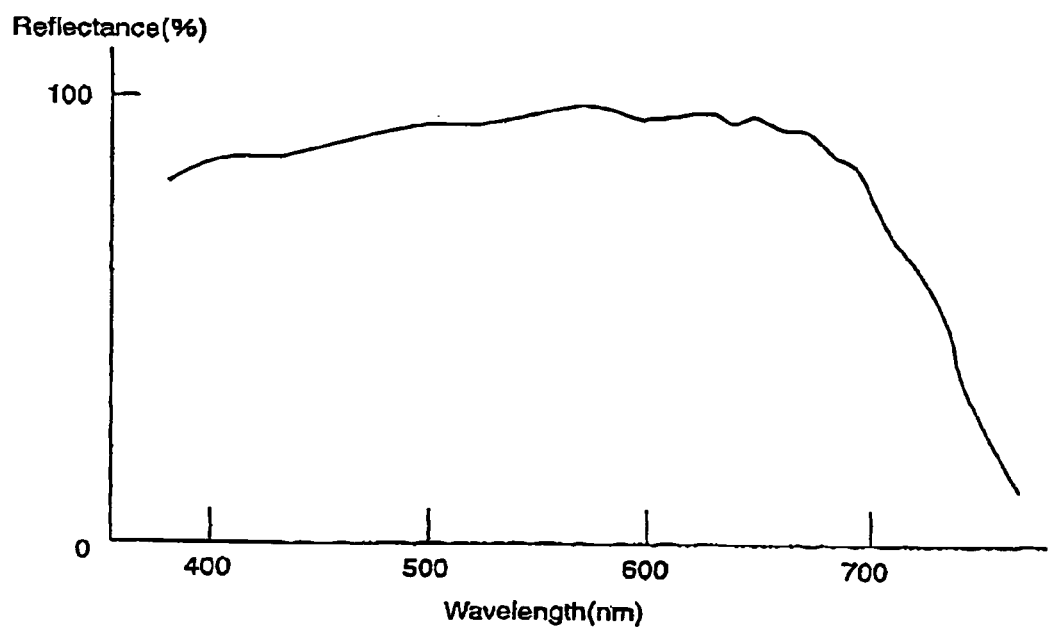
FIG. 16 is a diagram showing reflection characteristics of a screen of the prior art laser projector.

FIG. 13 is a diagram for explaining the laser projector 500 according to the fifth embodiment.

The laser projector 500 according to the fifth embodiment has a laser projection unit 40 which outputs laser beams 41, a screen 610 onto which the laser beams 41 from the laser projection unit 40 are projected, and glasses 510 for observing pictures which are projected on the screen 610. The laser projection unit 40 is identical to that of the laser projector according to the second embodiment, and the screen 610 is identical to that in the conventional laser projector.

In the fifth embodiment, the glasses 510 to be used for viewing the pictures on the screen 610 utilize a filter which transmits only laser beams of three colors which are emitted from the respective lasers.

Next, the function and effect will be described.

Since, in the fifth embodiment, the glasses 510 to be used for viewing pictures on the screen 610 have a filter which transmits only laser beams of three colors that are emitted from the respective lasers, the contrast on the screen 610 when pictures on the screen are viewed through the glasses 510 is increased up to 100 even in a state where the indoor illumination 30 is turned on.

More specifically, according to this embodiment, only lights emitted from the lasers, i.e., light 511 with wavelengths near 660 nm, near 532 nm, and near 457 nm can be viewed through the glasses, while lights with other wavelengths such as illumination light 32 reflected by the screen are cut out and do not come into sight.

While in this fifth embodiment the glasses are adopted as the light transmitting member that has specific light transmission characteristics and is used for viewing pictures on the screen, the light transmitting member is not limited to these glasses but may be anything that covers the eyes, such as goggles.

Further, while the typical illumination such as a fluorescent lamp is employed as the indoor illumination 30 in this fifth embodiment, lasers which emit laser beams with wavelengths of 480 nm, 555 nm, and 630 nm may be used as the indoor illumination. Since, in this case, the selectivity of wavelengths of the light transmitting member such as glasses is increased, the contrast of pictures on the screen 610 is improved, and grayish-block phenomenon in pictures on the screen 610 can be completely prevented. It goes without saying that the wavelengths of the laser beams herein used as the indoor illumination are not limited to those described above.

Further, according to the fifth embodiment, the laser projector has the same structure as that of the second embodiment, while the laser projector according to the fifth embodiment may have the same structure as that of the conventional laser projector or the laser projector according to the first embodiment. Alternatively, this laser projector may have the same structure as that of the rear-transmission type laser projector according to the fourth embodiment. Also in these cases, the same effect can be obtained.

While in the above-mentioned embodiments the lasers 1, 2, and 3 of red, blue, and green as primary colors are employed as the short-wavelength laser sources, it is also possible to employ, for example, two lasers of 450 nm and 490 nm as blue lasers, and consequently employ lasers of four wavelengths in total. Further, a larger number of lasers may be employed.

INDUSTRIAL AVAILABILITY

The laser projector according to the present invention is useful as one that can achieve fine pictures of good contrast in locations where light other than laser beams is applied on the screen.

The invention claimed is:

1. A laser projector which modulates laser beams, and projects the modulated laser beams, comprising:
   short-wavelength laser sources that emit at least laser beams of three colors of red, blue and green;
   a modulation unit that modulates the laser beams from the laser sources on the basis of a picture signal; and
   a screen onto which the modulated laser beams are projected, wherein
   said screen has characteristics of reflecting incident light such that reflection peaks for the incident light are located at wavelengths of the at least laser beams of three colors of red, blue and green, which are emitted from the short-wavelength laser sources, and at neighboring wavelengths, and
   wherein a projection room in which the screen is placed is illuminated by illumination light that has significantly low levels of wavelength components corresponding to the wavelengths of the at least laser beams of three colors of red, blue and green, which are emitted from the short-wavelength laser sources.

2. The laser projector as defined in claim 1, wherein the screen has a reflector which reflects only the at least laser beams of three colors of red, blue and green, which are emitted from the short-wavelength laser sources, and lights in a neighboring wavelength band.

3. The laser projector as defined in claim 2, wherein the neighboring wavelength band of the wavelengths of the at least laser beams of three colors of red, blue and green, which are reflected by the reflector, has a range of longer than 3 nm and shorter than 10 nm, with the wavelengths of the respective laser beams being in a center of the range.

4. The laser projector as defined in claim 2 wherein the reflector comprises a dielectric multilayer film.

5. The laser projector as defined in claim 2 wherein the reflector is formed using a hologram recording material.

6. A laser projector which modulates laser beams, and projects the modulated laser beams, comprising:
   short-wavelength laser sources that emit at least laser beams of three colors of red, blue and green;
   a modulation unit that modulates the laser beams from the laser sources on the basis of a picture signal; and
   a screen onto which the modulated laser beams are projected, wherein
   said screen has characteristics of transmitting incident light such that transmission peaks for the incident light are located at wavelengths of the at least laser beams of three colors of red, blue and green, which are emitted from the short-wavelength laser sources, and at neighboring wavelengths, and
   wherein a projection room in which the screen is placed is illuminated by illumination light that has significantly low levels of wavelength components corresponding to the wavelengths of the at least laser beams of three colors of red, blue and green, which are emitted by the short-wavelength laser sources.

7. The laser projector as defined in claim 6, wherein
said screen has an absorber that transmits the at least laser beams of three colors of red, blue and green, which are emitted from the short-wavelength laser sources, and lights in a neighboring wavelength band, and lights in a wavelength band where luminosity factor is significantly low.

8. The laser projector as defined in claim 7, wherein
the neighboring wavelength band of the wavelengths of the at least laser beams of three colors of red, blue and green, which are transmitted by the absorber, has a range of longer than 3 nm and shorter than 10 nm, with the wavelengths of the respective laser beams being in a center of the range.

9. The laser projector as defined in claim 7 wherein
the absorber is formed by laminating plural filters each cutting out lights having predetermined wavelengths, among light incident on the absorber.

10. The laser projector as defined in claim 6 wherein
the laser sources are located on a rear side of the screen, and light projected from the laser sources on the screen is observed from a front side of the screen.

* * * * *